United States Patent [19]

Luo

[11] Patent Number: 5,994,609
[45] Date of Patent: Nov. 30, 1999

[54] METHODS OF TREATING NUCLEAR HYDROXYAPATITE MATERIALS

[76] Inventor: Ping Luo, 2843 A Forest Ave., Berkeley, Calif. 95705

[21] Appl. No.: 08/991,396

[22] Filed: Dec. 16, 1997

Related U.S. Application Data

[60] Provisional application No. 60/032,743, Dec. 16, 1996.

[51] Int. Cl.⁶ .................................................. G21F 9/00
[52] U.S. Cl. .............................. 588/2; 588/13; 588/256; 264/0.5
[58] Field of Search ................. 588/2, 13, 252, 588/256, 10; 264/0.5

[56] References Cited

U.S. PATENT DOCUMENTS

| | | | |
|---|---|---|---|
| 4,234,632 | 11/1980 | Lubowitz | 428/2 |
| 4,335,086 | 6/1982 | Spencer . | |
| 4,371,484 | 2/1983 | Inukai et al. . | |
| 4,859,367 | 8/1989 | Davidovits | 252/628 |
| 4,932,853 | 6/1990 | Unger et al. | 264/0.5 |
| 5,108,956 | 4/1992 | Inoue et al. . | |
| 5,158,756 | 10/1992 | Ogawa et al. . | |
| 5,162,600 | 11/1992 | Cody et al. | 588/256 |
| 5,205,928 | 4/1993 | Inoue et al. . | |
| 5,495,064 | 2/1996 | James et al. | 588/256 |
| 5,512,702 | 4/1996 | Ryan et al. | 588/256 |
| 5,646,972 | 7/1997 | Carpena et al. | 588/16 |
| 5,678,233 | 10/1997 | Brown | 588/2 |

FOREIGN PATENT DOCUMENTS 62-34100  2/1987  Japan ...................................... 588/10

OTHER PUBLICATIONS

Jeanjean et al., Sorption of uranium and other heavy metals on hydroxyapatite (1995) *Radioanal. Nucl. Chem.* 201:529–539.

*Primary Examiner*—Steven Bos

[57] ABSTRACT

Methods are provided for treating liquid hazardous waste containing anionic radioactive or heavy metal materials by binding the hazardous waste to hydroxyapatite powder, drying and then cold or hot pressing the hydroxyapatite powder into a solid mass for storage or disposal. The methods are useful for treatment and storage of radioactive waste, anions, and heavy metals. Methods are also provided for treating high concentration liquid hazardous waste and liquid hazardous waste which does not contain materials known to decompose at high temperatures.

14 Claims, 1 Drawing Sheet

Flow Chart of Processing DOE Liquid Mixed Waste for Permanent Storage 5,994,609

METHODS OF TREATING NUCLEAR HYDROXYAPATITE MATERIALS

This application claims th benefit of U.S. Provisional Application Ser. No. 60/032,743, filed Dec. 16, 1996.

TECHNICAL FIELD

This invention pertains to treatment of hazardous waste. In particular, this invention provides methods of treating hazardous mixed liquid waste which includes radioactive and heavy metal waste using hydroxyapatite. The methods of this invention allow negatively charged radioisotopes, such as Technetium, to be treated and stored.

BACKGROUND ART

As a result of research and production of nuclear weapons, large amounts of radioactive and heavy metal waste have been generated. This waste, termed "mixed waste" when it contains both radioactivity and other hazardous waste products, can have a tremendous impact on the environment and pose serious health risks to the general population. Hazardous waste products are also generated in hospitals, industries and other commercial facilities through a number of processes such as medical diagnostic testing, pharmaceutical and biotechnology research and pesticide research. In 1990, the United States produced over 4000 m$^3$ of low level mixed waste including 2,840 m$^3$ of liquid waste, 720 m$^3$ of organic solvents such as chlorofluorocarbons (CFC's), corrosive organics and waste oil and 120 m$^3$ of toxic metals. The Department of Energy (DOE) estimates that nuclear sites in 22 states will produce over 226,000 m$^3$ of nuclear waste over the next two decades and that it will cost over $60 billion to treat or store this waste over a 75 year period. Thus, treatment and disposal of these wastes poses tremendous technical and environmental problems. To further complicate the situation, there is currently no available treatment method for technetium (Tc), a major waste product of nuclear facilities in the form of $TcO_4^-$.

The DOE reports that 399,000 m$^3$ of high level radioactive waste are currently stored in large tanks at four locations: Hanford, Washington; Idaho National Engineering Laboratories (INEL), Idaho; Savannah River Site (SRS), South Carolina; and the West Valley Demonstration Project, New York. DOE is proceeding with plans to treat high level waste by processing it into a solid form (e.g. borosilicate glass) that would not be readily dispersable into the air or leachate into the ground or surface water. This treatment process is called vitrification. The vitrification process will generate approximately 29,000 canisters to be disposed of in a geologic repository.

Hazardous waste can easily contaminate its environment. For instance, over the past decade, several incidents have occurred in which radioactive material used in industrial devices has been mixed with scrap metal that was being recycled for steel production. This radioactive material (usually cesium) cannot always be detected because it is shielded by the container or scrap metal. Consequently, the radioactive dust can contaminate the steel facility's emission control system and the emissions dust. Steel producers in the U.S. are currently storing more than 10,000 tons of contaminated dust. In most cases, this waste contains both radioactivity and other hazardous materials such as lead, cadmium and chromium.

Disposal options for these materials have been limited, principally because of their mixed waste classification and the cost associated with disposal of large volumes of mixed or radioactive waste. Thus, because of high cesium concentrations, hazardous waste facilities may not provide suitable treatment protocols. Similarly, licensed low-level radioactive waste disposal facilities can only dispose of the cesium after the other hazardous waste has been removed. One procedure involves immobilizing radionuclides on solid matrixes and building barriers around the matrixes to minimize the spread or immobilization. However, hazardous waste can leach out of the barriers and permeate the surrounding environment.

Jeanjean et al. (1995) *J. Radioanal. Nucl. Chem.* 201(6) 529–539 describe how the cations uranium, cadmium and lead can be sorbed to hydroxyapatite (HA). These authors postulate that these positively-charged elements are immobilized by occupying empty $Ca2^+$ sites on the HA.

Thus, there remains a need for a safe and inexpensive method of treating hazardous waste, including materials such as Technetium, mixed waste and heavy metals.

DISCLOSURE OF THE INVENTION

As will become apparent, preferred features and characteristics of one aspect of the invention are applicable to any other aspect of the invention.

In one aspect, the invention provides a method for treating a liquid containing hazardous waste comprising the steps of (a) contacting the liquid containing hazardous waste with an hydroxyapatite (HA) powder to bind the waste to the hydroxyapatite powder; (b) separating the liquid from hydroxyapatite powder bound to the waste; (c) drying the HA; (d) cold-pressing the HA at a temperature ranging from about 0° C. to about 30° C. and at a pressure greater than 60 MegaPascals to form a solid mass of HA; and (e) disposing of the solid mass of HA from step (d).

In a preferred embodiment, the invention further comprises leach testing the solid mass of step (d) before disposing of the solid mass. In other preferred embodiments, the mixture of step (a) is heated to a temperature ranging from about 40° C. to about 100° C. for between about 10 minutes and about 12 hours and the liquid hazardous waste is mixed waste, preferably containing heavy metals or anionic radioactive materials.

In another preferred embodiment, step (a) comprises preparing a chromatographic column packed with hydroxyapatite particles and passing the liquid waste through the hydroxyapatite column, preferably wherein the HA particles are spherical and have a controlled morphology.

In yet another preferred embodiment, the invention includes using at least one mole of HA is contacted for every 2 moles of hazardous waste and air-drying the HA particles of step (c). In another preferred embodiment, the method comprises burying the solid mass of step (e) in the ground.

In another aspect, the invention provides a method for treating a liquid containing hazardous waste comprising the steps of (a) contacting the hazardous waste with an hydroxyapatite (HA) powder to bind the hazardous waste to the HA powder; (b) separating the liquid from the hydroxyapatite bound to the waste; (c) drying the HA of step (b); (d) contacting the liquid from step (b) with an amount of hydroxyapatite sufficient bind excess waste; (e) separating the liquid from step (d) from the hydroxyapatite; (f) drying the HA of step (e); (g) cold-pressing the HA of step (c) and step (f) at a temperature ranging from about 0° C. to about 30° C. and at a pressure greater than 60 MegaPascals to form a solid mass of HA.

In yet another aspect, the invention provides a method for treating a liquid containing hazardous waste comprising the steps of: (a) contacting the hazardous waste with an hydroxyapatite (HA) powder to bind the waste to the HA powder; (b) separating the liquid from the hydroxyapatite bound to the waste; (c) drying the HA; (d) hot-pressing the HA at a temperature ranging from about 900° C. to about 1100° C. and at a pressure greater than 60 MegaPascals to form a solid mass of HA; and (e) disposing of the solid mass of HA from step (d), wherein the hazardous waste does not contain materials which decompose at the hot-pressing temperature. In particularly preferred embodiment, the invention further comprises of sintering the solid HA mass.

In another aspect, the invention includes a method for treating a liquid containing hazardous waste comprising the steps of (a) contacting the hazardous waste with an hydroxyapatite (HA) powder to bind the hazardous waste to the HA powder; (b) separating the liquid from the hydroxyapatite bound to the waste; (c) drying the HA of step (b); (d) contacting the liquid from step (b) with an amount of hydroxyapatite sufficient bind any excess waste; (e) separating the liquid from step (d) from the hydroxyapatite; (f) drying the HA of step (e); (g) hot-pressing the HA of step (c) and step (f) at a temperature ranging from about 900° C. to about 1100° C. and at a pressure greater than 60 MegaPascals to form a solid mass of HA, wherein the hazardous waste does not contain materials which decompose at the hot-pressing temperature. In particularly preferred embodiment, the invention further comprises of sintering the solid HA mass.

MODES FOR CARRYING OUT THE INVENTION

Figure 1:
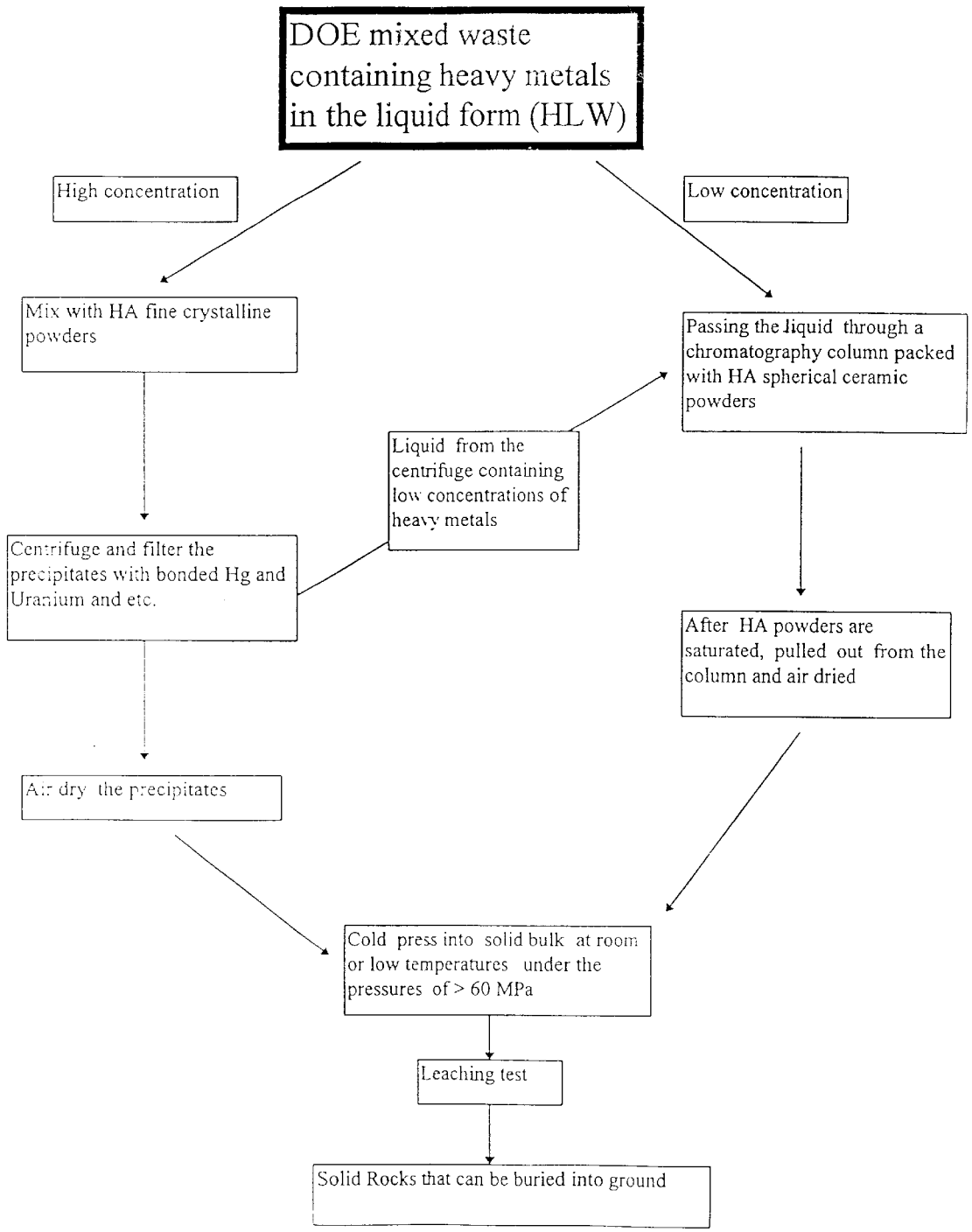
FIG. 1 is a flowchart showing how liquid mixed waste can be treated using hydroxyapatite.

Throughout this application, various publications, patents and published patent applications are referred to by an identifying citation. The patents, publications and published patent specifications referenced in this application are hereby incorporated by reference into the present disclosure to more fully describe the state of the art to which the invention pertains.

As used herein, certain terms will be used that have defined meanings.

As used herein, "Atomic Energy Act (AEA)" refers to the 1954 Act of Congress which created the Atomic Energy Commission (AEC). The AEC later split into the Nuclear Regulatory Commission (NRC) and the Energy and Research and Development Administration (ERDA). ERDA then became part of the Department of Energy in 1977. This act encouraged the development and use of nuclear energy and research for the general welfare and for the common defense and security for the United States. It is the basis of authority for the NRC, DOE, and the Environmental Protection Agency (EPA) in regulating radioactive materials defined in the ABA. NARM is not defined under this act and is therefore not subject to its requirements.

The term "anion" or "anionic" refers to any negatively charged ion, for example, $MnO_4^-$ or $TcO_4^-$. "Cation" refers to any positively charged ion.

The term "By-product Material" refers to any radioactive material (except special nuclear material) yielded in, or made radioactive by, exposure incident to the process of producing or utilizing special nuclear material, and the tailings or wastes produced by the extraction or concentration of uranium or thorium from ore processed primarily for its source material content, including discrete surface wastes resulting from uranium solution extraction processes. Thus, there are two basic types of by-product materials: one produced by a nuclear reactor and another produced by the uranium and thorium mining process. Underground ore bodies depleted by these solution extraction operations do not constitute "by-product material" within this definition (10 CFR 20.1003).

The term "CERCLA (Superfund)" refers to the Comprehensive, Emergency Response, and Compensation and Liability Act (also known as Superfund) passed by Congress in 1980. This Act addresses immediate and long term threats to the public health and the environment from abandoned or active sites contaminated with hazardous or radioactive materials. Under the Superfund program, EPA has the authority to clean up the nation's worst hazardous waste sites using money from a trust fund supported primarily from a tax on chemical feedstocks used by manufacturers. Companies or individuals responsible for the wastes are identified by EPA, if possible, and made to pay for the cleanups. The Superfund Amendments and Reauthorization Act (SARA) of 1986 reauthorized CERCLA to continue cleanup activities around the country. Several site-specific amendments, definitions, clarifications, and technical requirements were added to the legislation, including additional enforcement authorities. Title III of SARA also authorized the Emergency Planning and Community Right-to-Know Act (EPCRA).

The term "Curie (Ci)" refers to the unit of radioactivity equal to $3.7 \times 10^{10}$ disintegrations per second or $3.7 \times 10^{10}$ becquerel (Bq). A common unit used in environmental measurements is the picocurie (pCi) which is equal to $1/10^{-12}$ Ci or 0.037 disintegrations per second or 0.037 Bq.

The "Department of Energy (DOE)" refers to the Federal agency whose mission is to achieve efficiency in energy use, diversity in energy sources, a more productive and competitive economy, improved environmental quality, and a secure national defense. DOE was created on Oct. 1, 1977 out of the Energy and Research and Development Agency as well as various aspects of non-nuclear federal energy policy and programs. The DOE complex, which is located over 22 States with sites that range in size from small to very large, produced and tested nuclear weapons.

The "Environmental Protection Agency (EPA)" was created in 1970, the EPA is responsible for working with state and local governments to control and prevent pollution in areas of solid and hazardous waste, pesticides, water, air, drinking water, and toxic and radioactive substances.

The "Federal Facilities Compliance Act (FFCA or FFCAct)" refers to an amendment to RCRA. The FFCA waives immunity for DOE and other Federal Agencies, allowing States and the EPA to impose penalties for non-compliance and requires DOE to develop plans for treating the hazardous components of radioactive wastes subject to RCRA requirements.

The term "half-life" is used to mean the time it takes for half of a radioactive material to radiate energetic particles and rays and transform to new materials. For example, cesium ($Cs^{137}$) has a half life of thirty years. After this time, half of the $Cs^{137}$ decays to a non-radioactive stable nuclide, barium (Ba-137).

The term "hazardous waste" refers to any solid wastes that pose substantial or potential threats to public health or the environment including any waste that meets the criteria specified in 40 CFR 260 and 261: (a) is specifically listed as a hazardous waste by EPA; (b) exhibits one or more of the characteristics of hazardous waste (ignitability, corrosivity, reactivity, and/or toxicity); (c) is generated by the treatment of hazardous waste; or is contained in a hazardous waste.

"High Level Radioactive Waste (HLW)" refers to radioactive waste material that results from the reprocessing of spent nuclear fuel, including liquid waste produced directly from reprocessing and any solid waste derived from the liquid that contains a combination of transuranic and fission product nuclides in quantities that require permanent isolation. HLW is also a mixed waste because it has highly corrosive components or has organics or heavy metals that are regulated under RCRA. HLW may include other highly radioactive material that NRC, consistent with existing law, determines by rule requires permanent isolation.

The term "heavy metal" or "RCRA Metals" refers to hazardous waste which can damage organisms at low concentrations and tends to accumulate in the food chain. Examples include, but are not limited to, lead, chromium, cadmium, and mercury. Heavy metals generally accumulate in mineralized tissue such as bone and teeth.

As used herein, "hydroxyapatite" means a chemical composition having the general formula $Ca_{10}(PO_2)_6(OH)_4$ as it is commonly known to those of skill in the art. Naturally-occurring hydroxyapatite is a calcium-phosphate structure which forms a major component of mineralized structures of the human body. Hydroxyapatite is also useful as a tool for separating and isolating biomolecules such as proteins and nucleic acids. Currently, hydroxyapatite materials having a granule size above 20 $\mu$m are commercially available. (e.g., Sigma HA-Ultragel 60–180 $\mu$m). As used herein, "hydroxyapatite powder" means any particulate form of a substance. The term includes, therefore, granules, grains, fragments, particles, dust or the like.

The term "Liquid Scintillation Cocktail (LSC)" refers to the common fluid used in medical laboratories to analyze DNA and proteins. It often uses radioactive tracers and RCRA listed hazardous materials such as Toluene and Xylene. The combination of the two make it a mixed waste. By volume it is the most common form of commercially generated mixed waste. One 1990 study indicated that over 71% of mixed waste is LSC.

"Low-Level Radioactive Waste (LLRW or LLW)" is waste that satisfies the definition of LLRW in the Low-Level Radioactive Waste Policy Amendments Act of 1985 (LLRWPAA). The LLRWPAA defines LLRW as "radioactive material that (A) is not high-level radioactive waste, spent nuclear fuel, or byproduct material as defined in section 11e.2 of the Atomic Energy Act of 1954 and; (B) the Nuclear Regulatory Commission, consistent with existing law and in accordance with paragraph (A), classifies as low-level radioactive waste." LLRW encompasses materials that are slightly above natural radiation background levels to highly radioactive materials which require extreme caution when handling (Greater than Class C—GTCC). "Low-Level Mixed Waste (LLMW)" refers to waste that contains LI,RW and hazardous waste.

The term "Mixed Transuranic Waste (MTRU)" refers to mixed waste having both Transuranic (TRU) and hazardous wastes. Approximately 55% of DOE's TRU is MTRU. MTRU is currently being treated and stored at six DOE sites: Hanford, (3,000 m$^3$); INEL (38,000 m$^3$); Los Alamos National Laboratories, New Mexico (8,000 m$^3$); Rocky Flats, Colorado (1,500 m$^3$); Oak Ridge National Laboratories, Tennessee (1,500 m$^3$); SRS (5,000 m$^3$).

"Mixed Waste (MW)" refers to both hazardous waste (as defined by RCRA and its amendments) and radioactive waste (as defined by AEA and its amendments). It is jointly regulated by NRC or NRC's Agreement States and EPA or EPA's RCRA Authorized States. The fundamental and most comprehensive statutory definition is found in the Federal Facilities Compliance Act (FFCA) where Section 1004(41) was added to RCRA: "The term 'mixed waste' means waste that contains both hazardous waste and source, special nuclear, or byproduct material subject to the Atomic Energy Act of 1954."

The term "Naturally Occurring or Accelerator Produced Radioactive Materials (NARM)" refers to any radioactive materials not covered under the AEA that are naturally occurring or produced by an accelerator. Accelerators are used in sub-atomic particle physics research. These materials have been traditionally regulated by States. NARM waste with more than 2 nCi/g of 226 Ra or equivalent is commonly referred to as discrete NARM waste; below this threshold, the waste is referred to as diffuse NARM waste. NARM waste is not covered under the AEA, not a form of LLW, and is not regulated by NRC.

"Naturally Occurring Radioactive Materials (NORM)", a subset of NARM, refers to materials not covered under the AEA whose radioactivity has been enhanced, usually by mineral extraction or processing activities. Examples are exploration and production wastes from the oil and natural gas industry and phosphate slag piles from the phosphate mining industry. This term is not used to describe or discuss the natural radioactivity of rocks and soils, or background radiation, but instead refers to materials whose radioactivity is technologically enhanced by controllable practices.

The "Nuclear Regulatory Commission (NRC)" is an independent regulatory agency created out of the Atomic Energy Commission in 1975 to regulate the civilian uses of nuclear material. Specifically, the NRC is responsible for ensuring that activities associated with the operation of nuclear power plants and fuel cycle plants, and medical, industrial, and research applications, are carried out with adequate protection of the public health and safety, the environment, and national security. At full complement, the NRC has five Commissioners nominated by the President and confirmed by the Senate; the President designates one of the Commissioners as Chairman. NRC regulates all commercial AEA materials. Except in a few cases, NRC does not regulate DOE. NRC does not regulate NARM.

As used herein, the term "rad" or "Radiation Absorbed Dose" refers to a unit of measurement of absorbed dose of radiation. One rad is defined as 100 ergs per gram of material. The unit rad can be used for any type of radiation. This relates to the amount of energy actually absorbed in some material, and is used for any type of radiation and any material.

The term "radiation" refers to ionizing radiation made up of highly energetic and penetrating x-rays and gamma rays and lesser penetrating particles. Beta particles are simply energetic electrons and alpha particles are helium nuclei both arising from the nucleus of a decaying atom. The alpha particle is the easiest of these radiations to stop and the gamma rays are the most difficult to shield against. A piece of paper can stop an alpha particle, but it may take as much as many inches of lead shielding to stop most of the x- rays or gamma rays in a beam. Depending on the dose, kind of radiation, and observed endpoint, the biological effects of radiation can differ widely. Ionizing radiation has been proven to cause cancer at high doses and is assumed to cause cancer and other deleterious health effects at low doses. Examples of radiation emitting compounds include, but are not limited to, $^{32}P$, $^{35}S$, $^{3}H$, $^{14}C$, $^{121}I$, $^{111}In$, $^{238}U$, $^{239}Pu$ and Tc.

The term "Rem" or "Roentgen Equivalent Man" refers to the unit used to derive a quantity called equivalent dose. This relates the absorbed dose in human tissue to the effective biological damage of the radiation. Equivalent dose is often expressed in terms of thousandths of a rem, or mrem.

The term "solid waste" refers to any solid, semi-solid, liquid, or contained gaseous materials discarded from industrial, commercial, mining, or agricultural operations, and from community activities. Solid waste includes garbage, construction debris, commercial refuse, sludge from water supply or waste treatment plants, or air pollution control facilities, and other discarded materials. Solid waste does not include solid or dissolved materials in irrigation return flows or industrial discharges which are point sources subject to permits under section 402 of the Clean Water Act or source, special nuclear, or byproduct material as defined by the AEA.

The term "source material" refers to Uranium or Thorium ores mined from the Earth. Source material is defined in 10 CFR 20.1003 as "(1) Uranium, or thorium or any combination of uranium and thorium in any physical or chemical form; or (2) Ores that contain, by weight, one-twentieth of 1 percent (0.05 percent), or more, of uranium, thorium, or any combination or uranium and thorium. Source material does not include special nuclear material."

"Special Nuclear Material (SNM)" is used as defined in 10 CFR 20.1003 as "(1) Plutonium, uranium-233, uranium enriched in the isotope 233 or in isotope 235, and any other material that the NRC, pursuant to the provisions of section 51 of the AEA, determines to be SNM, but does not include source material; (2) or any material artificially enriched by any of the foregoing but does not include source material." SNM is important in the fabrication of weapons grade materials and as such has strict licensing and handling controls.

The term "Spent Nuclear Fuel (SNF)" refers to fuel which has been withdrawn from a nuclear reactor following irradiation and has undergone at least one year's decay since being used as a source of energy in a power reactor. SNF has not been chemically separated from its constituent elements by reprocessing. SNF includes the special nuclear material, byproduct material, source material, and other radioactive materials associated with fuel assemblies. See 10 CFR 72.3 for more details.

The term "Storage-in-Decay" refers to radioactive material which has decayed to the point where a radiation survey meter cannot distinguish between it and natural background radiation levels.

"Transuranic Radioactive Waste (TRU)" refers to waste that contains more than 100 nanocuries of alpha-emitting transuranic isotopes, with half-lives greater than twenty years, per gram of waste. TRU does not include (1) high-level radioactive waste; (2) wastes that DOE has determined, with the concurrence of EPA, do not need the degree of isolation required by EPA's high level waste rule (40 CFR 191); or (3) waste that has approved for disposal on a case-by-case basis in accordance with NRC's radioactive land disposal regulation (10 CFR Part 61). TRU is not generally found outside the DOE complex and is mainly produced from the reprocessing of spent nuclear fuel, nuclear weapons production, and reactor fuel assembly. TRU wastes mainly emit alpha particles as they break-down.

As used herein, "sinter" means fritting together of small particles to form larger particles, cakes or masses, usually under the influence of heat or pressure. Thus, temperature or pressure can be varied to produce one large cake or mass, or, more frequently, to aggregate small particles into multiple larger particles.

The term "vitrification" refers to the process of converting materials into a glass-like substance, typically through a thermal process. Radionuclides and other inorganics are chemically bonded in the glass matrix. Consequently vitrified materials generally perform very well in leach tests. EPA has specified, under the land disposal restrictions, vitrification to be the treatment technology for high-level waste.

A "Waste Isolation Pilot Plant (WIPP)" is a potential geologic disposal facility for transuranic (TRU) radioactive waste generated as by-products from DOE's nuclear weapons production. Currently, the DOE operates a WIPP in excavated, natural salt formations, near Carlsbad, New Mexico. Before DOE can dispose of waste at the WIPP, it must demonstrate that the WIPP complies with EPA's radioactive waste disposal standards. DOE must submit a "compliance application" to EPA showing how the WIPP facility will meet the standards. The WIPP facility is scheduled to begin operation in the Spring of 1998, subject to EPA approval of DOE's compliance application. Also, DOE plans to submit a petition to EPA, to demonstrate that Mixed TRU (MTRU) disposal at the WIPP will not migrate beyond the WIPP unit boundary, and therefore the waste would not need to be treated to meet RCRA Land Disposal Restrictions (LDR). At present, DOE is required to treat all MTRU to meet the appropriate LDR's.

Treatment of Liquid Mixed Waste for Permanent Storage

This invention provides methods of treating hazardous waste by binding the waste materials to hydroxyapatite (HA). While it is known in the art that hydroxyapatite binds to cations, it is the surprising discovery of this invention that hydroxyapatite binds negatively charged ions and radioactive waste. Thus, hydroxyapatite can be used to bind hazardous materials and safely dispose of these hazardous waste products.

The methods of this invention essentially involve contacting hazardous mixed waste with hydroxyapatite powder under conditions which allow the waste to bind to the hydroxyapatite, drying and pressing the HA, and storing the solid rocks of HA. Leaching tests can be performed as required by the government to determine where the solid waste-containing HA can be stored. The hazardous waste treated by the following methods is preferably liquid mixed waste, and can be at either low concentration or high concentrations. Preferably, the hazardous waste contains heavy metals. A schematic flow-chart outlining the methods described herein is provided in FIG. 1.

Treatment of Low Concentration Liquid Mixed Waste

Low concentration mixed waste can be treated by contacting the hazardous liquid with an amount of HA sufficient to bind the waste. The amount of powder necessary can be determined by routine experimentation. Preferably, at least about 1 mole of HA is used for every 2 moles of hazardous waste. The waste and HA can be mixed by any method known in the art. In a preferred embodiment, the HA is packed into a chromatography column and the liquid passed over this column. Mixing by shaking, stirring or the like are also suitable. Prior to separation of the liquid from the HA powder, the mixture of liquid hazardous waste and HA powder can be heated. In a preferred embodiment, the mixture is heated for about 10 minutes to about 12 hours at a temperature ranging from about 40° C. to about 100° C.

Separation of the liquid from the solid can be performed by any means known in the art. For example, centrifugation, sedimentation, filtration or the like can all be employed in the practice of this invention. Other methods of separation will be known to those of skill in the art.

Hydroxyapatite powder may be purchased from any commercial supplier, for example, BioRad. Alternatively, the HA powder can be synthesized by any method known in the art. (see, e.g., U.S. Pat. No. 4,335,086; U.S. Pat. No. 4,371,484; U.S. Pat. Nos. 5,108,956 and 5,205,928 and U.S. Pat. No. 5,158,756). The HA powder may be porous or non-porous, preferably the powder is made up of fine particles which have controlled morphology and known diameters. In a particularly preferred embodiment, the fine particles are spherical in shape.

The liquid phase can be tested for remaining contaminants, for instance by measuring radioactivity using a liquid scintillation counter or by monitoring the characteristics of the fractions collected from the column. As is known to those of skill in the art, conventional chromatographic equipment may include means of measuring elutant for specific characteristics. When contaminants cannot be detected in the liquid phase, it can be discarded. The methods described herein can be repeated until the liquid has no detectable waste.

The HA powder which has bound the hazardous waste is then separated out from the liquid phase. Separation may be accomplished by any means known in the art, including, for example, centrifugation, filtration or evaporation. The The HA powder is then dried. Preferably, the powder is air-dried at about room temperature.

The dried powder is then cold-pressed using at least about 60 MegaPascals of pressure. Preferably, the dried powder is cold-pressed at a temperature ranging from about 4° C. to about 30° C. By cold-pressing the HA particles form a solid mass which traps the waste therein.

Alternatively, if the waste is known not to have materials which decompose at high temperatures, the dried powder can be hot-pressed at about 900° C. and at a pressure greater than 60 MegaPascals to form a solid mass. The solid HA mass can also be sintered. Materials which are known to decompose include, for example, mercury.

The waste-containing solid can then be stored in facilities, or, preferably buried in the ground. Leaching tests can be performed as required by the Federal government to confirm that the waste is contained within the solid rock.

Treatment of High Concentration Liquid Mixed Waste

When treating high concentration liquid mixed waste it is preferable to mix the waste with HA fine particles in two steps. Methods of treating high concentration liquid mixed waste are diagrammed in FIG. 1. The waste is first mixed with a sufficient amount of HA fine crystalline powder to bind hazardous waste products such as heavy metals. Preferably, at least one mole of HA is used for every 2 moles of waste. The HA powder and liquid are then separated as described above and the HA powder air dried and cold-pressed. Preferably, the powder is air-dried at room temperature and cold-pressed at a temperature ranging from about 0° C. to about 30° C. and a pressure of at least 60 MegaPascals.

The liquid phase is then mixed with HA fine particles as described above. Preferably, spherical HA particles are packed into a chromatography column and the liquid passed through the column. The amount of waste in the liquid phase can be detected as described above and repeated contact with HA powder employed if necessary. The liquid phase is then separated from the HA powder as described above and then the HA powder dried and cold-pressed at a temperature ranging from about 0° C. to about 30° C. and a pressure of at least 60 MegaPascals.

Treatment of Mixed Waste Without Materials which Decompose at High Temperatures

The present invention can also be used to treat hazardous wastes which are known to contain only materials which are stable at high temperatures. These wastes are bound to HA powder as described above and the liquid separated from the powder. The powder is then hot-pressed at a temperature ranging from about 900° C. to about 1100° C. to form solid HA. Optionally, the solid HA can then be sintered. Preferably, sintering is performed at a temperature ranging from about 1100° C. to about 1400° C.

EXAMPLES

Modifications of the above-described modes for carrying out the invention that are obvious to those of skill in the fields of chemistry, chromatography, material science and related fields are intended to be within the scope of the following claims.

Example 1

Binding of Potassium Permanganate (KMnO4) to Hydroxyapatite Powder

In order to demonstrate the binding of negatively charged ions to hydroxyapatite, the following experiment was performed using $MnO_4^-$, a member of VIIB on the periodic chart.

Two mL of $KMnO_4$ was diluted into 12 mL of distilled water in a standard test tube. In solution, $MnO_4^-$ produces a dark pink color. Five mLs of spray-dried hydroxyapatite loose powder was added to the $KMnO_4$ solution at room temperature. The resulting mixture was mixed and shaken and then allowed to set until the HA powder settled to the bottom of the tube. The settled HA powder was pink and the dark color of the solution decreased over time. No significant change in color was observed after approximately 30 minutes.

The test tube containing the $KMnO_4$/HA was heated in a water bath around 50° C. overnight. After heating, the solution and powder were both white. This change from pink to white indicates that $MnO_4^-$ ions were completely bonded to the HA and that the ionic structures had also been changed. Thus, these results demonstrate that HA can be used to bind negatively charged ions.

Example 2

Binding of Radioactive Technetium ($TcO_4^-$) to Hydroxyapatite

Like $MnO_4^-$, $TcO_4^-$ is a negatively charged ion from the VII B group in the periodic table. The following experiment demonstrates disposal of radioactive $TcO_4^-$ mixed waste by binding to hydroxyapatite.

Two mLs of waste containing radioactive $TcO_4^-$ is diluted into 12 mL of distilled water in a standard test tube. In solution, $TcO_4^-$ produces a dark color. Five mLs of spray-dried hydroxyapatite loose powder is added to the $TcO_4^-$ solution at room temperature. The resulting mixture is mixed and shaken and then allowed to set until the HA powder settled to the bottom of the tube. The settled HA powder is colored and the dark color of the solution decreases over time.

The test tube containing the $TcO_4^-$/HA is heated in a water bath around 50° C. overnight. After heating, the $TcO_4^-$ ions are completely bonded to the HA and the ionic structures also changes.

I claim:

1. A method for treating a liquid hazardous waste comprising the steps of:
   (a) contacting the liquid hazardous waste containing anionic radioactive or heavy metal materials with hydroxyapatite powder to bind the radioactive or heavy metal anionic waste to the hydroxyapatite powder;
   (b) separating liquid from the hydroxyapatite powder bound to the radioactive or heavy metal anionic waste;
   (c) drying the hydroxyapatite powder bound to the radioactive or heavy metal anionic waste;
   (d) cold-pressing the dried hydroxyapatite powder from step (c) at a temperature ranging from about 0° C. to about 30° C. and at a pressure greater than 60 MPa to form a solid mass of hydroxyapatite containing the anionic waste; and
   (e) disposing of the solid mass of hydroxyapatite from step (d).

2. The method according to claim 1 further comprising leach testing the solid mass of step (d) before disposing of the solid mass.

3. The method according to claim 1 wherein the liquid hazardous waste includes anionic heavy metal materials.

4. The method according to claim 1 wherein the liquid hazardous waste includes anionic radioactive materials.

5. The method according to claim 1 wherein step (a) comprises:
   (a) preparing a column packed with hydroxyapatite particles; and
   (b) passing the liquid waste through the packed column.

6. The method according to claim 5 wherein the hydroxyapatite particles are spherical.

7. The method according to claim 1 wherein the liquid hazardous waste decomposes at high temperatures.

8. The method according to claim 5 wherein the hydroxyapatite particles are porous.

9. The method according to claim 5 wherein the hydroxyapatite particles are dense.

10. The method according to claim 5 wherein the column includes filters.

11. A method for treating a liquid hazardous waste comprising the steps of:
    (a) contacting the hazardous waste containing anionic radioactive or heavy metal materials with hydroxyapatite powder to bind the waste to the hydroxyaptite powder;
    (b) separating liquid from the hydroxyapatite powder bound to the waste;
    (c) drying the hydroxyapatite powder bound to the waste from step (b);
    (d) contacting the separated liquid from step (b) with hydroxyapatite powder to bind any remaining anionic waste in the liquid to the hydoxyapatite powder;
    (e) separating liquid from the hydroxyapatite bound to the waste of step (d);
    (f) drying the hydroxyaptite bound to the waste of step (e);
    (g) forming a mixture of the dried hydroxyapatite powder from step (c) and step (f); and
    (h) cold-pressing the hydroxyapatite of step (g) at a temperature ranging from about 0° C. to about 30° C. and at a pressure greater than 60 MPa to form a solid mass of hydroxyapatite containing the anionic waste.

12. A method for treating a liquid containing anionic hazardous waste comprising the steps of:
    (a) contacting the anionic hazardous waste with hydroxyapatite powder to bind the waste to the hydroxyapatite powder;
    (b) separating liquid from the hydroxyapatite powder bound to the waste;
    (c) drying the hydroxyapatite powder bound to the waste from step (b);
    (d) hot-pressing the dried hydroxyapatite powder at a temperature ranging from about 900° C. to about 1100° C. and at a pressure greater than 60 MPa to form a solid mass of hydroxyapatite containing the anionic waste;
    (e) sintering the solid mass of hydroxyapatite from step (d); and
    (f) disposing of the solid mass of hydroxyapatite from step (e), wherein the anionic hazardous waste does not contain materials which decompose during the hot-pressing and sintering steps.

13. A method for treating a liquid containing anionic hazardous waste comprising the steps of:
    (a) contacting the anionic hazardous waste with hydroxyapatite powder to bind the waste to the hydroxyapatite powder;
    (b) separating liquid from the hydroxyapatite powder bound to the waste;
    (c) drying the hydroxyapatite powder bound to the waste from step (b);
    (d) contacting the separated liquid from step (b) with hydroxyapatite powder to bind any remaining anionic waste in the liquid to the hydroxyapatite powder;
    (e) separating liquid from the hydroxyapatite powder bound to the waste of step (d);
    (f) drying the hydroxyaptite powder bound to the waste from step (e);
    (g) forming a mixture of the dried hydroxyapatite powder from step (c) and step (f); and
    (h) hot-pressing the dried hydroxyapatite powder from step (g) at a pressure greater than 60 Mpa to form a solid mass of hydroxyapatite containing the anionic waste.

14. The method according to claim 13 further comprising the step of sintering the solid hydroxyapatite mass.

* * * * *